2 Sheets—Sheet 2.
J. C. LEIDY.
CULTIVATOR.
No. 174,686. Patented March 14, 1876.
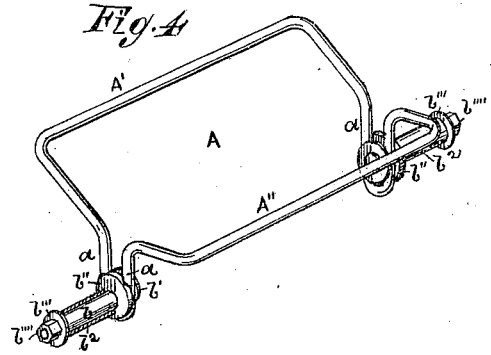
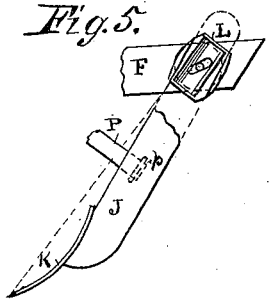
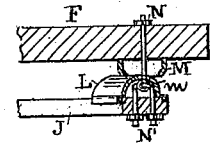
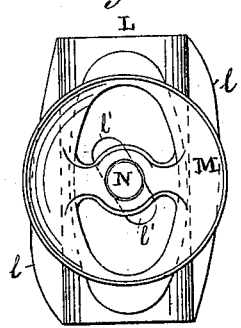

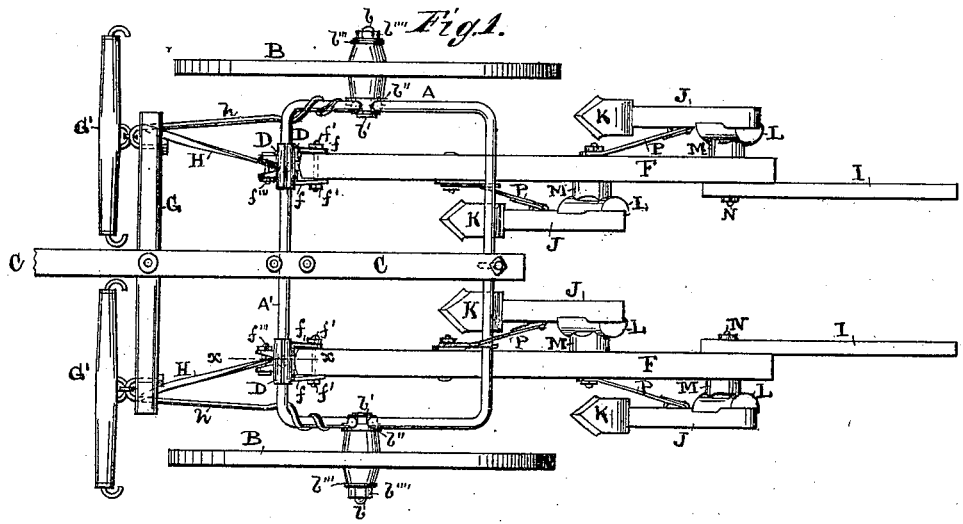

UNITED STATES PATENT OFFICE.

JAMES C. LEIDY, OF GALESBURG, ILLINOIS.

IMPROVEMENT IN CULTIVATORS.

Specification forming part of Letters Patent No. 174,686, dated March 14, 1876; application filed November 10, 1875.

*To all whom it may concern:*

Be it known that I, JAMES C. LEIDY, of Galesburg, county of Knox and State of Illinois, have invented certain Improvements in Cultivators, of which the following is a specification:

This invention relates to improvements in that class of cultivators known as "straddle-row cultivators;" and the invention consists, first, in the construction of the axle; second, in the method of attaching the plows to the axle; third, in the method of adjusting the shovel-standards upon the beams; fourth, in the method of adjusting the supporting-wheels on the axle; fifth, in the method of regulating the draft, all as hereinafter fully described.

In the accompanying drawings, Figure 1 is a top-plan view of a machine embodying my invention. Fig. 2 is a side elevation, near wheel removed. Fig. 3 is a vertical central sectional view of the pendent connection of the plow-beams to the axle, on the line $x$ $x$ in Fig. 1. Fig. 4 is a perspective view of the axle, and a central sectional perspective view of the attachment of the wheel thereto. Fig. 5 is an enlarged side elevation of the rear end of one plow-beam and the shovel-standard. Figs. 6 and 7 are elevations of opposite sides of the standard-block, and Fig. 8 is a horizontal sectional view through Fig. 5.

Referring to the parts by letters, A represents the axle, formed of a bar of iron, preferably round iron, bent, as plainly shown at Fig. 4, so that its upper portion forms a rectangle with a front side, A', and rear side A'', and its sides projected downward, as at $a$ $a$, to form a support for the wheel-spindle $b$, which is carried therein by having a head, $b'$, upon one end, and a notched washer, $b''$, and a washer, $b'''$, and nut $b''''$ upon its other end, and a thimble, $b^2$, between the washers $b''$ and $b'''$. The method of adjusting the wheel-spindle between the bars $a$ $a$, so as to regulate the depth of plowing or cultivating, will be evident from an inspection of Fig. 4. B B are the supporting-wheels. C is the tongue, mounted centrally upon and secured to the bars A' A''. D D are clamp-plates, secured to the bar A' by bolts $d$, so that they may turn on said bar. E E are pendants, secured one within each clamp-plate D by spherical heads $e$ on their ends, seated in globular cavities in the clamp-plates, and held loosely by the bolts $d$, to allow of rotation in lateral planes of the rods E. F F are the plow-beams, with the side beam-plates $f$ on their forward ends, to which they are pivoted by bolts $f'$, on which the necessary vertical movement, or raising and lowering the rear ends of the plow-beams, is procured. The adjacent faces of the projecting ends of the beam-plates $f$ are provided with grooves $f''$ for the reception of the pendants E, which are secured firmly between them by the bolt $f'''$, the necessary lateral movement of the plow-beams being effected by the rotation of the pendants E in the clamp-plates D, and the necessary advancing and receding movement of the plows independent of each other being effected by the rotation of the clamp-plates D on the bar A'. G is the evener-bar, pivoted centrally to the tongue C, and provided at each end with pendants $g$, from the lower ends of which rods H extend to the beam-plates, and are attached loosely to the bolts $f'''$, so as not to interfere with the lateral movement of the plows. The single-trees G' are also hooked to the pendants $g$. $h$ are rods provided with eyes at their rear ends, which encircle the sides of the axle, and are provided at their forward ends with hooks to engage with either of the series $g'$ of holes in the pendants $g$.

It will be evident that the degree of advancing and receding movement of the plow-beams independent of the axle may be regulated by raising and lowering the hook-rod $h$ in the holes $g'$. It will also be seen from the foregoing that the single-tree to which each draft-animal is attached is connected directly to the end of the plow-beam, and that each animal draws its own plow, and that the advancing or receding of the animals does not affect the angle of the axle to the line of progression of the machine.

I I are the ordinary plow handles; J J, the ordinary standards, and K the ordinary shovels. L are the standard-plates, semicircular in cross-section, as shown, their flat sides provided with diagonal ledges $l$, which embrace each side of the standard J, and hold the plate L thereto in such position that its semi-cylindrical side points in a direction toward the point of the shovel, as shown by the dotted line $y\ y$ at Fig. 5. M are blocks or plates with flat sides, which rest against the beams and grooved sides for the reception of the semi-cylindrical sides of the standard-plates L. N is a bolt which passes through the plow-beam, and through a hole in the plate M, and is connected by an eye, $n$, with a bolt, N′, which passes through the standard, as shown at Fig. 8. The hole $l'$ for the passage of the bolt N through the plate L is a diagonal slot, as shown at Figs. 6 and 7, so that as the standard and plate L are turned for adjustment the sides of the slot will always bear against the bolt N. Placing the plates L, as described, pointing to the point of the shovels K, it will be evident that turning the standard to adjust the lateral angle of the shovel to throw the dirt, more or less, to or from the corn will not carry the point of the shovel out of position by carrying it to the right or left hand, as is the case when the standard is turned for the purpose on its longitudinal axis. P are the standard-braces, connected by bolts to the plow-beams at their upper ends, and their lower ends, by hinges $p$, to the inner sides of the standards, so as to allow of the lateral adjustment of the shovels by turning the standards. R are hooks midway on the plow-beams, and which may be hooked over the bar A″, to suspend the plows above the ground when desired. By means of the adjustment of the spindles $b$ in the bars $a\ a$, and of the adjustment of the beam-plates on the pendants E, a great degree of change may be effected in the depth of penetration of the shovels.

I claim—

1. The axle of a straddle-row cultivator, constructed of a single bar of iron, bent so as to form a rectangular frame, with downwardly-projecting parts $a\ a$, between which the spindles of the supporting-wheels are secured, substantially as and for the purpose specified.

2. The pendants E, having spherical heads $e$, in combination with the clamp-plates D and bolts $d$, substantially as and for the purpose specified.

3. The standard-plates L, placed diagonally on the standards, and combined with the plates M, beams F, standards J, and bolts N, substantially as described, and for the purpose specified.

4. The combination of the spindle $b$, having head $b'$, with the notched washer $b''$, axle-bars $a\ a$, and thimble $b^2$, substantially as and for the purpose specified.

5. The evener G, pendants $g$, rods $h$ H, combined with the beams F, pendants E, and axle A, and tongue C, substantially as and for the purpose specified.

JAMES C. LEIDY.

Witnesses:
 THOS. McKEE,
 W. B. RICHARDS.